TYPE PRINTING TELEGRAPH SYSTEM WITH ERROR CORRECTION

Filed May 12, 1953 2 Sheets-Sheet 1

SEVEN UNIT CODE

| | a | b | c | d | e | f | g |
|---|---|---|---|---|---|---|---|
| SIGNAL I | X | O | O | X | X | O | O |
| IDLE TIME α | O | X | O | X | O | X | O |
| IDLE TIME β | O | O | O | O | X | X | X |

INVENTOR.
Hendrik Cornelis Anthony van Duuren.
BY Brown, Jackson, Boettcher & Dienner
Attys.

Nov. 10, 1959 H. C. A. VAN DUUREN 2,912,498

TYPE PRINTING TELEGRAPH SYSTEM WITH ERROR CORRECTION

Filed May 12, 1953 2 Sheets-Sheet 2

INVENTORS.
Hendrick Cornelis
Anthony van Duuren
BY Brown, Jackson, Boettcher & Dienner
Attys.

United States Patent Office 2,912,498
Patented Nov. 10, 1959

2,912,498

TYPE PRINTING TELEGRAPH SYSTEM WITH ERROR CORRECTION

Hendrik Cornelis Anthony van Duuren, Wassenaar, Netherlands, assignor to Staatsbedrijf der Posterijen, Telegrafie en Telefonie, The Hague, Netherlands Application May 12, 1953, Serial No. 354,591

Claims priority, application Great Britain May 13, 1952

23 Claims. (Cl. 178—23)

The present invention relates to a printing telegraph system, and more particularly to a novel telegraph system which includes error correction means at each station operative to detect receipt of a mutilated signal and to request retransmission of the signal by the transmitting station.

The conventional type telegraph system basically comprises at least a first and a second station A and B interconnected by a single channel having a first and second leg. In its simplest form a transmitter T1 at the first station A is operative to transmit intelligence in code form over a first leg of a channel (identified as the "go" leg for station A) to the receiver unit R2 at the second station B. A transmitter T2 at the second station B is operative to transmit signals over a second leg of the channel (identified as the "go" leg for station B) to the receiver R1 at the first station A.

In one of the more conventional systems, the letters and numbers of the intelligence to be transmitted are first converted into the so-called five element Baudot code, in which each letter or number is represented by five marking and spacing elements, the positions and numbers of the marking and spacing elements being different for different letters. Such code has been highly accepted in the field by reason of the limited number of elements which are required to effect the transmission of message information over a channel.

In the transmission of the intelligence between a pair of stations, random noise interference experienced in the interconnecting channel frequently results in message mutilation and the advantage which is gained by the use of limited number of elements in the Baudot code is substantially offset by the susceptibility of the signals to mutilation during transmission. As a result, there has been developed in the field apparatus known as code converting equipment which transforms the signals, prior to transmission, from the variable ratio five element Baudot code into a code in which each of the signals has constant ratio of marking and spacing elements. Associated scanning apparatus at each station may then examine each incoming signal for the stated number of marking and spacing elements, and in the event of variation from the predetermined constant ratio may provide an indication of the signal mutilation.

According to conventional practice, whenever a possible signal mutilation is detected, the station at which such detection occurs is operative to transmit a warning signal to the station from which the intelligence was originally transmitted; signal warning equipment at the latter being operative to terminate the signal transmitting operation and to effect retransmission of the particular signal which has been indicated as mutilated. Systems of such type have been fully set forth in the U.S. Patents Nos. 2,518,405; 2,603,705; 2,703,361; and 2,706,215.

It is apparent from the foregoing brief description that when two stations are interconnected by a channel in an area which is subjected to large amounts of random noise and electrical interference, the rate of intelligence transmission between the two stations varies as the function of the amount of noise on the channel. That is, as the noise increases causing more signals to be mutilated in the transmission, the signal warning equipment effects a request for more and more repeat signals so that the normal time required for transmission of a message is correspondingly increased. A specific object of the present invention is to provide an arrangement in which intelligence is transmitted more expeditiously, and particularly in areas of localities which experience large amounts of electrical noise. In this respect, the term "noise," as herein used, denotes all phenomena which interfere with the normal transmission of signal traffic including fading as well as transient electrical pulses.

As indicated above, the channel between stations A and B comprises a first and a second leg which have been identified as the "go" leg A—B for station A and the "go" leg B—A for station B. As used in the art the "go" leg for a station is the particular leg which is used to convey the output signals thereof to the associated receiver equipment at the other station. However, the "go" leg for one station constitutes the "return" leg for the other station. Thus leg B—A is in the "return" leg for "go" leg A—B, and leg A—B is the "return" leg for "go" leg B—A. During periods in which the first station A transmits message intelligence signals to the second station B over "go" leg A—B, the "return" leg B—A (which extends from transmitter T2 at station B to receiver R1 at station A) is used, if idle, to transmit information from station B to station A indicating the condition of the signals as received at station B. An analogous condition obtains in idle path A—B during the transmission of message signal intelligence over path B—A. Ostensibly the practice of transmitting such signals (referred to hereinafter as service signals) over the "return" leg, whenever a "go" leg is in use, results in a much more reliable signal transmission. However, it is apparent that the signals being transmitted for such purpose over the "return" leg are also exposed to mutilation by random noise disturbance and in turn may initiate warning signals. The consequent signal repetition which results, therefore, causes corresponding temporary delay in the transmission of the message intelligence over the "go" leg, and a reduction in the speed of message transmission.

It is a specific object of the present invention to decrease the possibility, and extent, of delay with message transmission as the result of mutilation of the service signals on the "return" leg of an intelligence conveying loop. As shown hereinafter, such object is achieved by providing a second or modified code for the service signals which, in one embodiment, may comprise three groups of signals; each group being characterized and recognized, for example, by the spacing or marking nature of only three of the seven elements in such signals, which are mutually exclusive to the intelligence representing signals in the first code.

The invention, while illustrated and discussed hereinafter in connection with a particular example in which the traffic-free leg of the system is most affected by noise is also concerned with the condition in which the traffic carrying leg is conveying message intelligence, that is transmitting traffic at intentionally reduced rates. This entails a reduction in the per second number or repetition mechanism operations involved and may be accomplished while maintaining the normally used (seven-unit) code by sending each traffic signal two or more times in succession, or by sending a signal on the "return" leg only if each of the transmissions of such signals are multilated. In still other cases, this may be accomplished by printing a single one of the correctly received signals of a group of two or more, etc. An adjustment of the system to a lower (respectively higher) transmitting rate may be controlled by the emission of suitable successions of service signals taken from the group of idle time or warning signals in the second code, which signal set is described more fully hereinafter.

Other objects, features and advantages of the invention will be appreciated from the following description and drawings in which:

Figure 1 sets forth a sample set of three different signals which comprise a second or modified code to be used according to the invention to reduce the number of message interruptions caused by poor traffic conditions on an idle leg;

The system in which the novel equipment of the invention is to be included is well known in the art and has been described in detail in various publications, including U.S. Patent to H. C. A. van Duuren 2,706,215, which issued April 12, 1955. For purposes of simplifying the description of the present invention, and particularly the description relating to the position of the novel mutilation detection in the system, and its cooperation with the other components thereof, such system has been reproduced schematically in Figure 4 herein.

Figure 3:
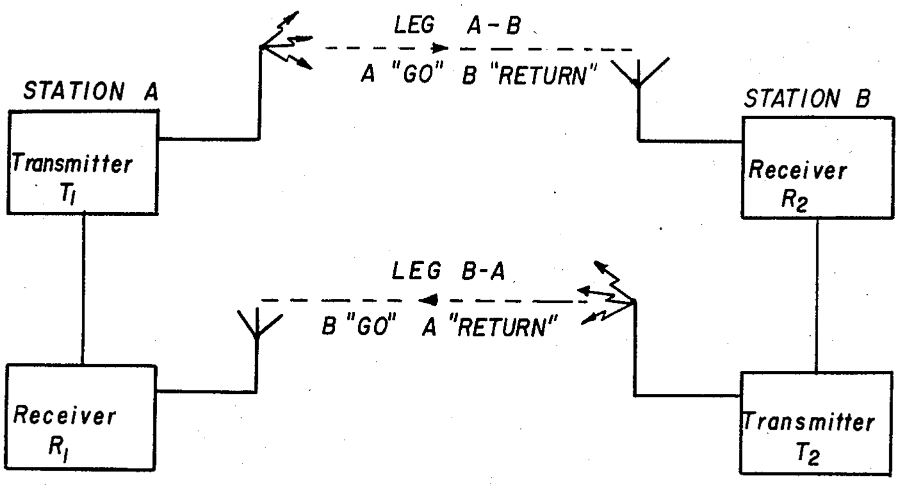
Figure 3 is a schematic block diagram illustrating the system and the "go" and "return" paths which connect the several stations of the system.
Figure 4:
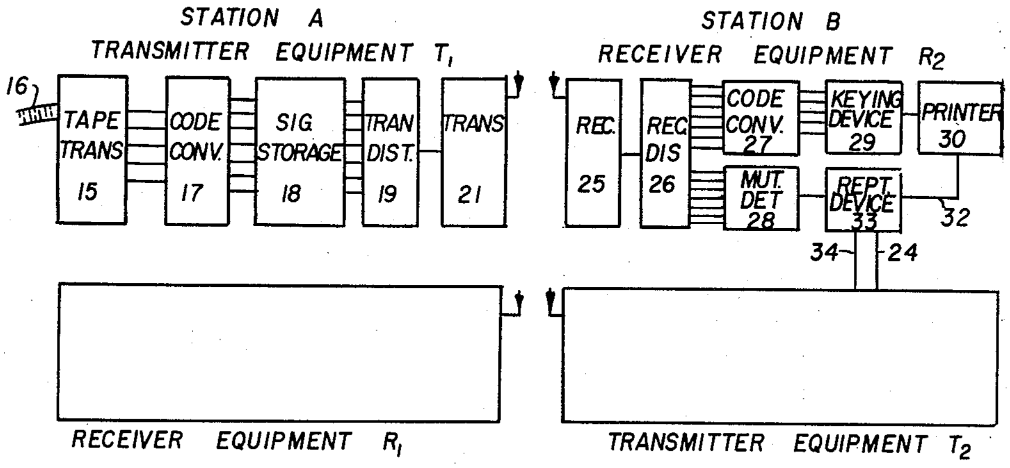
Figure 4 is a schematic block diagram of the manner of inclusion of the novel equipment in a conventional telegraph system.

With reference now to Figures 3 and 4, it will be apparent that the system includes a first station A and a second station B interconnected by a channel, including a first leg A—B and a second leg B—A to permit the coupling of traffic therebetween in both directions simultaneously. As indicated in Figure 3, the transmitting equipment T1 at station A utilizes the first leg A—B for transmitting messages to an associated receiver R2 at station B and a transmitter T2 at station B uses a second leg B—A in the transmission of message intelligence to an associated receiver R2 at station A. It will be apparent that during such periods as message intelligence is transmitted from station A to station B over the first leg A—B, the second leg B—A may be used for transmitting service signals from station B to station A for the purpose of indicating the condition of the signals incoming to station B. In such use, the second leg B—A is identified as the "return" leg for "go" leg A—B. A similar analogy obtains for message transmission in the direction B—A.

The transmitting equipment, such as transmitting equipment T1 at station A, basically comprises a tape transmitter 15 which is operative to scan the signals registered on an associated tape member 16 in the Baudot five-element code, and to transmit the signals as scanned over five conductors to the 5–7 element code convertor 17. Code convertor 17 automatically converts each five element signal coupled thereto into a monitorable seven element signal, and transmits the converted signal via signal storing device 18 to a transmitter distributor 19, the signals as transmitted over signal storage device 18 being stored therein for retransmission in the event of the receipt of a request from the distant station for repetition thereof as the result of the mutilation of the signal in the channel during transmission.

Transmitter distributor 19 in the associated equipment couples the signals to the transmitter 21 for transmission over the connecting link to the receiver 25 at station B. The receiving equipment at each station, such as receiver equipment R2 at station B, comprises a receiver unit 25 for receiving the incoming seven element signals from the transmitter T1 at station A, and a receiver distributor 26 which transmits the received seven element code to a 7–5 code converter 27 and simultaneously to a mutilation detector 28. The code converter 27 translates the seven element signals into the five element code and with the aid of a keying device 29 couples the signals to the teleprinter 30 for reproduction thereby.

As each signal is coupled to the mutilation detector equipment 28, the signal is checked thereby for the preassigned constant ratio, and in the event that a signal does not have such ratio, a warning signal is transmitted to repeating device 33 which in turn is operative over blocking conductors 24, 32, and 34 (*a*) to control the transmitting equipment T2 to send a warning signal to the receiver equipment R1 at station A indicating that a mutilated signal has been received, (*b*) to interrupt the energization circuit for the tape transmitter 15′ (not shown) in the transmitter equipment T2 to interrupt such message transmission as may have been in progress over the second leg B—A at the time the mutilation was detected in the first leg A—B, and (*c*) to block the distributor control unit 31 for a predetermined time period sufficient to permit retransmission by the mutilated signal at station A. The specific manner in which such system is operative to detect mutilated messages and to effect retransmission of a requested signal has been set forth in the above-identified patents, and reference is made thereto for the details of such teaching.

Figures 1, 2:
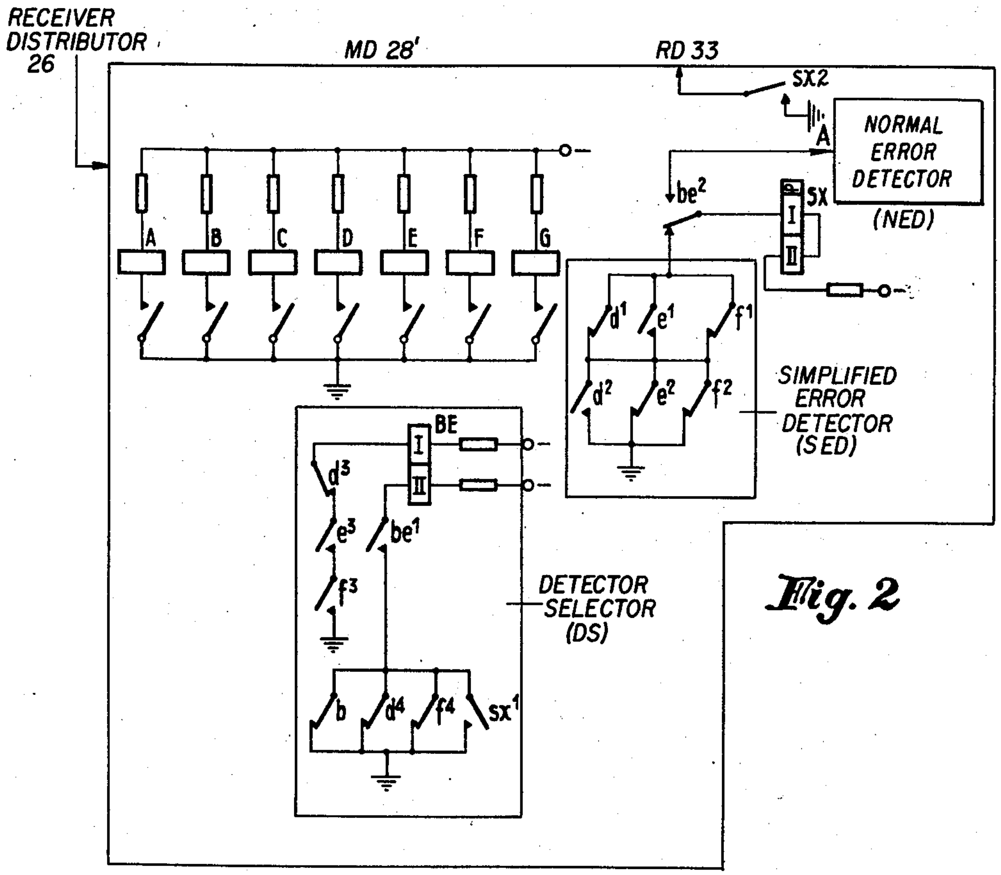
Figure 2 is a schematic illustration of the equipment associated with the receivers at each of the stations for the purpose of responding to the two different codes received thereat.

The novel mutilation or error detector equipment of the present disclosure is included in the mutilation detector 28 of the receiver equipment in each of the stations in the manner shown in Figure 2, and the equipment by reason of such inclusion is identified as a mutilation detector 28′. More specifically, the mutilation detector 28′ basically includes the conventional signal response relays A—G (Figure 2) which are connected to be controlled in the conventional manner by the output signals of the receiver distributor 26, and are in turn operative at their contacts *a*—*g* to control a first detector NED (Normal Error Detector) to check each signal for the 3 to 4 ratio in the manner of the patent disclosure. In the event that such relation does not exist, the detector NED completes a circuit to warning relay SX which operates, and at associated contacts, such as SX2, signals the repeat device 33 of the system to initiate a signal repeat request in the manner disclosed.

According to the teachings of the present invention, the mutilation detector 28′ additionally includes a second detector SED, and a detector selector DS which is operative to render the first detector NED and the second detector SED effective in an alternative manner. Detector selector DS basically comprises a control relay BE which is operative at its contacts $BE^2$ to control connection of the warning relay SX to either the conventional detector NED or to the newly added second detector SED illustrated in Figure 2. The detector selector control relay BE is controlled in its operation by an additional set of contacts on three of the signal responsive relays A—G (signal relays D, E, and F in the present example) to connect the first detector with receipt of the service signal $\beta$, to the warning relay SX, and with receipt of a signal $\alpha$, relay BE is restored to connect the second detector to the warning relay SX, as described in more detail hereinafter.

The second detector SED is arranged to monitor only a preselected number of the total elements of each signal received during the period the detector is rendered effective by the detector selector DS, and basically comprises an additional set of contacts on predetermined ones of the existing signal responsive relays A—G; the arrangement according to the present disclosure comprising an additional pair of contact sets on each of the relays D, E, and F. It is apparent that the relays thus selected may be varied, if desired, without departing from the scope of the invention, it being necessary in such modification to vary the signal code to conform therewith.

The specific manner in which the equipment is effective to automatically connect the first mutilation detector NED, and alternatively the second mutilation detector SED for operation in the system and the manner of operation in response to the receipt of different service conditions is now set forth hereat.

*Specific description*

As shown in Figure 3, the transmitter at station A is connected to the receiver at station B by a first path A—B, and the transmitter at station B is connected to the receiver at station A over a second path B—A. Thus, it is possible to transmit messages from station A to station B over path A—B and simultaneously to transmit messages from station B to station A over path B—A.

The signals are transmitted in two codes, the signals of the first code which are transmitted over the "go" leg being conventional in nature. That is, each signal is comprised of four spacing elements and three marking elements arranged according to a first code to indicate certain message intelligence.

According to a basic concept of the invention, the second signal code which is used in the transmission of information over the return leg of each loop comprises a set of signals which are readily distinguishable from the signals of the first code by the nature of certain elements therein. With reference to Figure 1, three service signals α, β and I of the second code are set out as they appear in relation to the several units of the seven-unit code; the equipment at each of the stations being operative to transmit the signals during the periods indicated below:

(*a*) *Signal I.*—This is the signal by means of which repetition of mutilated signals is requested, the station which receives the mutilated signal over its incoming path being operative to transmit this warning signal (over its outgoing path) back to the station which transmitted the original signal.

(*b*) *Idle time α.*—This is the idle time signal transmitted by a station over its outgoing path during periods when there are no messages being transmitted thereover:

(*c*) *Idle time β.*—This is the signal transmitted by a station when there are messages to be transmitted following idle time α. Such signal causes the changeover from the first error detector device NED to the second error detector SED which checks the mark/space ratio of the service signals according to the present invention.

As a specific example of the operation of the equipment, reference is now made to Figures 2 and 3, it being assumed that messages are to be transmitted from station A to station B over path A—B, and simultaneously, other messages are to be transmitted from station B to station A over path B—A. Prior to the transmission of the message intelligence, the equipment at each transmitting station transmits the special service signal β (see Figure 1) to the receiver at the other station. If this signal is received correctly at station B, signal response relay D is maintained in its illustrated condition (space element), and relays E and F are operated to the marking condition. Relay BE is therefore energized over a circuit which extends from battery via windings (I) of relay BE, space contact $d_3$, mark contact $e_3$, mark contact $f_3$, to ground (the letters *d, e, f,* etc. corresponding with the designations D, E, F, of the relays, so that a space element in column "*d*" puts relay D in the space representing condition, etc.). Relay BE operates and at its contacts $be^2$ connects normal error detector NED to the SX relay and at its contacts $be^1$ completes a holding circuit for winding (II) of relay BE which extends from battery via winding II of relay BE, front contact $be^1$, space contact $d_4$ or *b*, to ground (one of the contacts *b*, $d_4$ or $f_4$ being in the spacing position for signal I and idle time β signals). If a signal which is being transmitted from station A to station B is mutilated on path A—B, the first error detector NED at station B will be operated as the mutilation is detected, and in turn, will operate warning relay SX at station B. In accordance with conventional practice, relay SX now controls the transmitter at station B (which has been sending messages in the manner described) to terminate its message transmission for four signal periods, and controls same to transmit signal I to station A over leg BA requesting repetition of the signal which has been mutilated.

The equipment at station A operates in response to the receipt of signal I to repeat the signal which was mutilated, and if the signal, as repeated, is now correctly received at station B, each station will resume its message transmission from the point of interruption. A more complete description of the manner in which the circuits of the system effect such operation will be found in prior art descriptions, including U.S. Patents No. 2,518,405, No. 2,703,361, and No. 2,706,215.

Whereas this practice of examining each signal for a 3–4 ratio is highly desirable during the periods of simultaneous message transmission over each of the paths, in many instances, only one of the stations will have a message to transmit, and accordingly the other one of the channels will be idle. During idle periods it is customary therefore to transmit an idle time signal over the idle leg of the channel for checking and synchronizing purposes.

For purposes of example, it is assumed that the path A—B is now idle and that the equipment at station A is transmitting an idle time signal (Figure 1) over path A—B to station B. It is, of course, apparent, that if the idle time signals (which are merely check and synchronizing signals) are checked for a 3–4 ratio in the manner of conventional practice, and are found to be mutilated, the equipment at B which may be transmitting message intelligence of the first code will be blocked for a period of four signals each time one of the elements in the idle time signal is mutilated. Thus, in a conventional system, the transmission of message signals on a path would be interrupted for the purpose of requesting an idle station to repeat an idle time signal which was improperly received. If the traffic conditions are extremely poor on the idle path, the situation becomes one where an intolerable number of interruptions occur on the message transmitting path, and a sort of "tail wagging the dog" situation develops.

In the present system, the detector selector DS is controlled by the signal response relay A—G whenever idle time signal is received over the incoming path of a station to connect the second detector SED to the path at that station. More specifically, when there are no messages to be sent from station A to station B, station A starts transmitting idle time α signals. If such a signal is received correctly at station B, relays B, D, and F assume the marking condition (see Figure 1—idle time α under *b, d,* and *f*). In such case, relay D is operated to the marking conditions and at its contacts $d^3$ opens the original energizing circuit for relay BE and relays B, D, F at their contacts *b*, $d^4$, $b^1$ to interrupt holding circuit for relay BE. As relay BE restores, it is effective at its contact springs $be^2$ to reconnect the second mutilation detector SED to warning relay SX.

The second mutilation detector SED, as shown in Figure 2, now scans only those elements of the incoming signals designated in columns *d, e,* and *f* of the Figure 1 tabulation, and as is apparent from the contact analysis shown in Figure 1, completes a circuit for relay SX whenever one of the elements in the columns *d, e,* or *f* is mutilated. If one of the elements in the columns *a, b, c,* and *g* of the incoming idle time α signal is mutilated, the mutilation is not detected by the detector SED, so that there is no request for repetition of the original signal, and such mutilations will pass unnoticed. Consequently, in a connection strongly affected by disturbances on the return leg, the number of requests for repetitions will be sharply reduced during periods in which only idle time $\alpha$ signals are being transmitted in that direction.

If a signal of the material being transmitted to the other station is mutilated, then the other station transmits a service signal I as before described. Assuming that the return leg is idle, the second error detector SED being connected thereto, signal I causes a changeover of relays D and E to the marking condition, and at their contacts $d^2$, $e^1$, respectively, completes a circuit for relay SX; such circuit extending from the battery via relay SX, contact $be^2$, mark contact $e^1$, mark contact $d^2$, and ground.

Ostensibly, the number of requests for repetition signals will be considerably reduced during those periods when there are no messages to be transmitted over a return leg. Consequently, the transmission speed of the system is considerably increased under these circumstances. Further, the system according to the invention insures a matching of the code to the information transmitted over a selected channel by automatically tailoring the code to the information.

While I have herein illustrated and described what I regard to be the preferred embodiment of my invention, nevertheless, it will be understood that such is merely exemplary and numerous modifications and re-arrangements may be made therein without necessarily departing from the essence of the invention.

I claim:

1. In a signal transmitting system having a plurality of interconnected stations, means at each station for at times transmitting message representative signals in a first code, means at each station for at other times transmitting signals for other purposes in a second code; receiving means at each station for receiving said signals as transmitted in said first and second codes, a first detector means at each station operative to detect mutilated ones of said signals which are received in said first code, a second detector means at each station operative to detect mutilated ones of said signals which are received in said second code, and mutilation indicator means at each station operative to send a signal-repeat request signal with detection of a mutilated signal by either of said detector means.

2. In a signal transmitting system having a plurality of interconnected stations, means at each station for at times transmitting message representative signals in a first code, means at each station for at other times transmitting other signals in a second code; receiving means at each station for receiving said signals as transmitted in said first and second codes, a first detector means at each station for detecting mutilated ones of said signals which are received in said first code, a second detector means at each station for detecting mutilated ones of said signals which are received in said second code, and a mutilation indicator unit common to said first and second detectors operative to send a signal-repeat request signal with detection of a mutilated signal by either one of said detector means.

3. An arrangement as set forth in claim 2 which includes means for effecting transmission of a signal in said second code as a synchronization signal over a path during periods in which no messages are being transmitted thereover in said first code.

4. In a signal transmitting system having a plurality of interconnected stations, a first means at each station for at times effecting transmission of message representative signals in a first code over its outgoing path; receiving means at each station for receiving said signals in said first code as transmitted by other stations, a first detector means at each station for detecting mutilated ones of said signals which are received in said first code; a second means at each station for effecting transmission over its outgoing path of signals in a second code responsive to the termination of transmission of signals in the first code thereover; a second detector means at each station operative to detect mutilated ones of said signals which are received thereat in said second code; and means at each station for connecting said first detector for operation whenever signals in said first code are received thereat, and for connecting said second detector for operation whenever signals in said second code are received thereat.

5. In a signal transmitting system having a plurality of interconnected stations, a first means at each station for at times transmitting message representative signals in a first code to another one of the stations, a second means at each station for at other times transmitting other signals in a second code, receiving means at each station for receiving said signals as transmitted in said first and second codes including a first detector means for examining the elements of each incoming signal in said first code for possible signal mutilation and a second detector means at each station operative to examine only a portion of the elements of each signal transmitted in said second code for signal mutilation, and mutilation indicator means at each station operative to send a warning signal upon detection of a mutilated signal by either of said detector means.

6. An arrangement as set forth in claim 5 in which the signals transmitted in each code include a like number of elements.

7. An arrangement as set forth in claim 5 in which the signals transmitted in each code each comprise seven elements designated as marking and spacing elements, and in which said first detector means is operative to examine the seven elements of each incoming signal in the first code for the existence of a predetermined ratio between the marking and spacing elements, and said second detector means is operative to examine said signals in said second code for the presence of predetermined marking and spacing elements at predetermined positions in each signal.

8. An arrangement as set forth in claim 7 in which said second detector means includes means operative to examine only a predetermined three elements of each seven element signal.

9. In a signal transmitting system having a plurality of interconnected stations, a first transmitter means at each station for at times effecting transmission of message representative signals comprised of marking and spacing elements arranged according to a first code; a second transmitter means at each station for at other times effecting transmission of signals comprised of marking and spacing elements arranged according to a second code; receiving means at each station for receiving said signals as transmitted in said first and second codes including a first detector means for examining each of the elements of each incoming signal for a predetermined ratio between the elements thereof; and a second detector means at each station operative to examine each signal transmitted in said second code for the presence of certain elements at certain positions of each signal; and mutilation indicator means at each station common to said first and second detector means operative to send a warning signal with detection of a mutilated signal by either of said detector means.

10. An arrangement as set forth in claim 9 in which said second detector includes means which are operative to examine only a certain three elements of said signals in the second code, whereby said mutilation indicator means is operative to request a repeat signal only if predetermined portions of the signals in the second code are mutilated.

11. An arrangement as set forth in claim 9 in which said second detector means includes means operative to examine only the fourth, fifth and sixth elements of each incoming signal, and means for effecting operation of said mutilation indicator means only if one of said three elements is found to be mutilated.

12. In a signal transmitting system having at least two stations interconnected by two paths, means at one station for effecting transmission of signals alternatively in a first and a second code over one of said paths, receiving means at the second station for receiving the signals transmitted by the other stations over said one path; means at the second station for transmitting signals alternatively in a first and a second code over the second path to said first station; receiving means at the first station for receiving the signals transmitted by said second station over said second path; means at each station for detecting mutilated ones of said signals transmitted in said first and second codes over either of said paths including a first means operative to examine the complete signals in said first code for mutilation, and a second means operative to examine only a predetermined portion of the signals in the second code for mutilation; and means at each station operative with detection of a mutilated signal by either of said first and second means in the path incoming thereto to interrupt its signal transmission over the path outgoing therefrom for the purposes of sending a request to the other station for repetition of the signal found to be mutilated.

13. An arrangement as set forth in claim 12 in which said first means includes means for transmitting message representative signals in said first code, and means for transmitting checking and synchronizing signals in said second code during idle periods; and in which said signal mutilation detecting means includes means operative to scan a number of the elements of each signal in the second code less than the whole to minimize the interruptions of the signal transmission outgoing from the station which detected the mutilated signals in the second code.

14. An arrangement as set forth in claim 12 in which each station includes means for effecting repeated transmission over its outgoing path of a first signal in said second code whenever an idle condition occurs in its outgoing path, and means for transmitting a second signal in said second code immediately prior to resumption of the transmission of message signals in said first code over its outgoing path.

15. An arrangement as set forth in claim 14 in which each station includes means operative with the first receipt of said first signal in said second code to connect said second detector means to its incoming path.

16. An arrangement as set forth in claim 14 in which each station includes means operative with the receipt of said second signal in said second code to connect said first detector means to its incoming path.

17. An arrangement as set forth in claim 14 in which each station includes means for transmitting a warning signal in said second code over said outgoing path responsive to receipt of a mutilated signal in its input path, and in which both said first and said second detectors at each station include means operative with receipt of said warning signal as either is connected to the incoming path to effect signal repetition by its associated transmitter means.

18. An arrangement as set forth in claim 1 in which each station includes a set of relays operative to scan the elements of each incoming signal, and in which said first and said second detector means are both controlled by the scanning output of said common relay set.

19. In a signal transmitting system having at least a first and a second station interconnected by at least one signal channel, means at each station for transmitting the signals of a first and a second signal group over said channel, each signal of each group being comprised of a given number of elements, scanning means at each station for scanning the elements of each signal incoming thereto for signal mutilation, and means for rendering said scanning means operative at times to examine only a portion of the elements of each signal, and operative at other times to examine all of the elements of each signal.

20. In a signal transmitting system having at least a first and a second station, a first and a second channel connecting said stations, means at said stations for transmitting message representative signals and service signals over said channels, each of said message representative and said service signals before transmission being comprised of a fixed ratio of marking and spacing elements, scanning means at each station for scanning signals incoming thereto for mutilation, means at each station for rendering said scanning means operative whenever message representative signals are being transmitted on one of said channels only and service signals are being transmitted on the other channel, to effect scanning of only a portion of the elements of the service signals and all of the elements of said message representative signals.

21. A signal transmitting system according to claim 20 which includes a number of receiving relays corresponding to the number of elements of said message representative and said service signals connected to indicate the nature of each incoming signal, a control relay operative upon reception of a first service signal by said receiving relays at a station to connect said scanning means to inspect all the elements of the incoming signals, and operative upon the reception of a second service signal to connect the scanning means to inspect only a portion of the elements of the received signals.

22. A signal transmitting system as set forth in claim 21 in which said scanning means includes a first and second detector, and which includes a second control relay for operating a repeat-request device whenever either detector detects a mutilated signal in the message representative and service signal groups.

23. In a signal transmitting system having at least a first and a second station, a first and a second channel connecting said stations, means at said first station for transmitting message representative signals and service signals over said first channel to said second station, means at said second station for transmitting message representative signals and service signals over said second channel to said first station, scanning means at each station for scanning signals incoming thereto for signal mutilation, means at each station operative during the period in which message representative signals transmitted in one direction are seriously disturbed by noise to transmit each signal $n$ times in succession, and means operative during such repeated transmission of the signals to provide a mutilation indication only after the signal is received mutilated $n$ times in succession.

References Cited in the file of this patent

UNITED STATES PATENTS

| | | |
|---|---|---|
| 2,235,755 | Bakker et al. | Mar. 18, 1941 |
| 2,279,353 | Van Duuren | Apr. 14, 1942 |
| 2,512,038 | Potts | June 20, 1950 |
| 2,518,405 | Van Duuren | Aug. 8, 1950 |